E. H. JONES.
ELECTRICAL WELDING APPARATUS.
APPLICATION FILED FEB. 27, 1914.

1,101,448.

Patented June 23, 1914.

Witnesses:
L. H. Cadarr.
G. C. Denny

Inventor
Ernest Henry Jones
by Foster Freeman Watson Cook
Attys

UNITED STATES PATENT OFFICE.

ERNEST HENRY JONES, OF LONDON, ENGLAND.

ELECTRICAL WELDING APPARATUS.

1,101,448.  Specification of Letters Patent.  Patented June 23, 1914.

Application filed February 27, 1914. Serial No. 821,463.

*To all whom it may concern:*

Be it known that I, ERNEST HENRY JONES, a subject of the King of England, residing at London, England, have invented certain new and useful Improvements in Electrical Welding Apparatus, of which the following is a specification.

This invention is for an improved electrical welding apparatus particularly applicable for carrying out the methods of welding disclosed in the specification of my copending application Serial No. 821,197.

The object of the invention is to provide a very simple but efficient fluid-cooled electrical welding apparatus suitable for embodiment in the form of a hand tool.

One feature of the invention consists in the combination in an electrical welding hand tool of a handle, a single welding roller rotatably mounted on the handle, a conduit for fluid extending through said handle and roller, means for supplying a cooling fluid to said conduit, and means for connecting the roller to an electrical circuit.

Other features of the invention will be more particularly described hereinafter, and reference is now directed to the accompanying drawings wherein there is illustrated certain forms of apparatus according to the invention.

Figure 1:
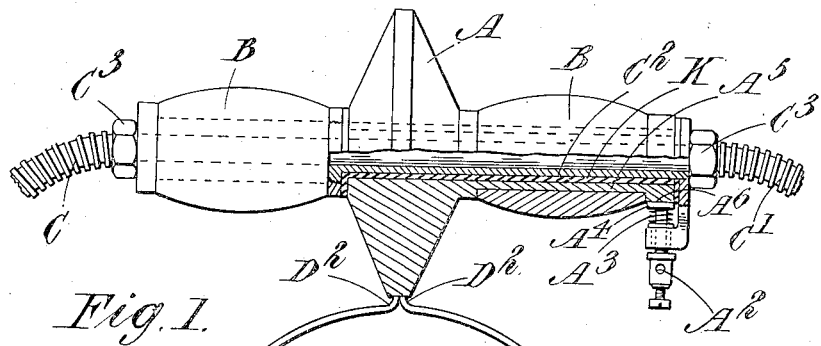
Figure 2:
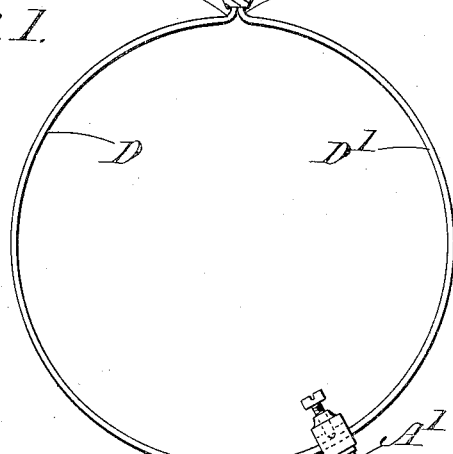
Figure 3:
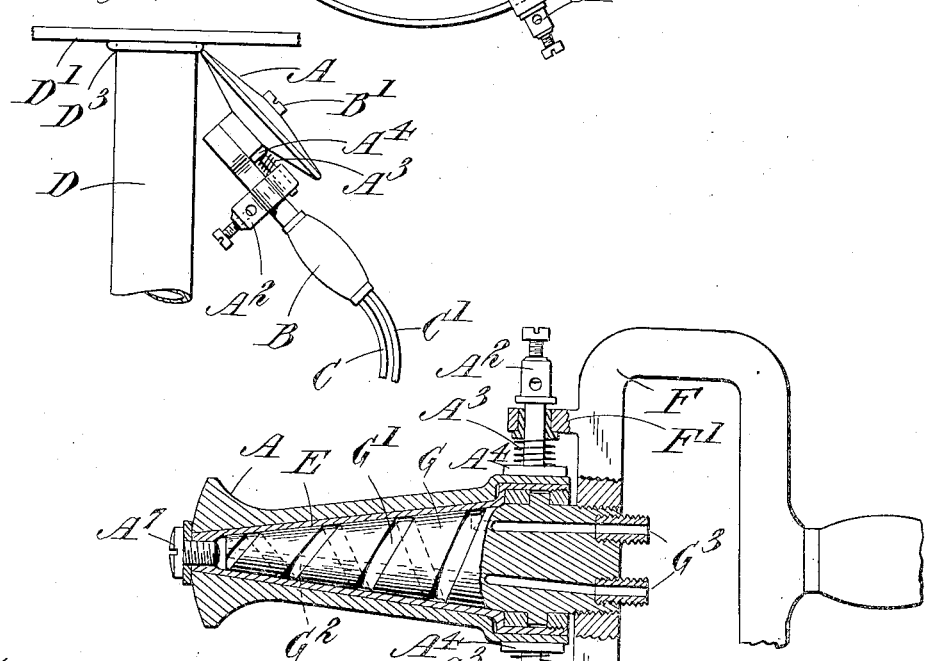

In these drawings Figure 1 is an elevation partly in section showing a welding apparatus arranged in its operative position relative to an article to be welded; Fig. 2 is an elevation of another form of welding apparatus; Fig. 3 is an elevation partly in section of a third form of welding apparatus.

Like letters of reference refer to like parts throughout the drawings.

In using the welding apparatus according to the present invention, the parts D, $D^1$ to be welded (herein termed the "work"), which in Fig. 1 are parts of one homogeneous strip but are separate and distinct in the remaining figures, are connected to one terminal $A^1$ of an electrical circuit. The other terminal $A^2$ of this circuit is connected, preferably through a brush contact member $A^4$ controlled by a spring $A^3$, to a single welding roller-electrode A which is carried on a support which may either be hand or machine-controlled as desired. In Figs. 1 and 2 handles B are shown, whereby the roller is manipulated. The roller A is shown in Fig. 1 as having an extended boss $A^5$ terminating in a flange $A^6$, and the contact member $A^4$ rests on this flange $A^6$. Electrical connection between the roller and the terminal is thus established.

The roller-electrode A shown in Figs. 1 and 2 is traversed internally by a current of cooling fluid which passes through the pipes C, $C^1$. The pipes C, $C^1$ are shown connected in Fig. 1 to a central tube $C^2$ which extends through the handles, the latter being held in place thereon by nuts $C^3$. A central stud-like support is left for the roller A. Conveniently the tube $C^2$ is insulated from the roller A and boss $A^5$ by a sleeve K. In Fig. 2, the handle B supports the single roller A by a projecting stud-member $B^1$.

The electric current traversing the circuit, of which the parts $A^1$ and $A^2$ are the terminals, is of a low voltage, conveniently about two volts, but the amperage is large and may be varied as desired in accordance with the nature of the material being welded.

To effect the weld, the roller-electrode A is brought into contact with the two edges to be welded, whereupon the electrical circuit within which these parts are included will be completed. Wide or narrow edges may be welded together, the roller-electrode being traversed along the edges as desired, or alternatively the roller-electrode may be held stationary and the parts to be welded be traversed in relation thereto until the weld is effected.

To assist in forming the weld the edges $D^2$ to be welded may be turned up as shown in Fig. 1, or beads may be formed thereon for the same purpose; or alternatively a glutting strip $D^3$ (see Fig. 2) of any suitable metal may be laid along the edges to be welded.

Referring now to Fig. 3 there is illustrated therein an apparatus comprising a conical stud-like support G on which is mounted the single welding roller-electrode A. An end-thrust screw $A^7$ secures the roller A in position. The support G is provided on its exterior with a helical groove $G^1$ and in its interior with a conduit $G^2$ for a cooling fluid. Surrounding the support G and secured thereto is a sleeve or bearing member E. The sleeve E forms a pocket at the end of the support G and the helical groove $G^1$ and the conduit $G^2$ lead up to this pocket. Provision is thus made for the circulation of a cooling fluid on the exterior of the support G and in the interior of the sleeve E. Suitable connections G³ are provided for the entrance and exit of the cooling medium. The support G is carried by a handle bar F which also carries on lugs F¹ the terminals A² which are connected in parallel and are in communication by means of brush contact members A⁴ controlled by springs A³ with a rubbing surface on the roller-electrode A.

It will be seen that the roller-electrode A and its support G are so shaped, and that the roller-electrode is so mounted on the support that the roller-electrode may be readily detached from the support. Thus one roller may readily be substituted for another of different contour.

The particular construction of apparatus shown in Fig. 3 is very efficient since it provides for the cooling medium to be brought into immediate contact with the parts liable to become heated, while the roller, by reason of its shape, is well adapted both to carry a large amperage without giving rise to sparking, and to be so shaped as to work within very confined spaces.

What I claim as my invention and desire to secure by Letters Patent is:—

1. Electrical welding apparatus comprising in combination a support provided on its exterior with a groove and in its interior with a conduit which communicates with the groove at one end of the support, means for circulating a cooling fluid through said groove and conduit, and a welding roller electrode mounted to rotate on the support and to surround the aforesaid groove in the support.

2. Electrical welding apparatus comprising in combination a support provided on its exterior with a helical groove and in its interior with a conduit which communicates with the groove at one end of the support, means for supplying a cooling fluid to the said groove and conduit, a bearing member mounted on the support and surrounding the aforesaid groove, and a welding roller electrode detachably mounted on said bearing member.

3. Electrical welding apparatus comprising in combination a conical support provided on its exterior with a helical groove and in its interior with a conduit which communicates with the groove at one end of the support, means for circulating a cooling fluid through said groove and conduit, a conical bearing member mounted on the support and surrounding the aforesaid groove and a welding roller electrode having a conical interior detachably mounted on said conical bearing member.

4. In electrical welding apparatus the combination with a handle of a stud-like support thereon, means for connecting two fluid-carrying conduits thereto, said support having cooling passages therein which communicate with the said conduits, a welding roller electrode mounted rotatably on the support, a lateral lug on the support and a spring pressed terminal carried by said lug and bearing against a rubbing face on the roller element.

5. An electrical welding hand tool comprising in combination a handle, a single welding roller rotatably mounted on the handle, a conduit for conveying fluid through said handle and roller, means for supplying a cooling fluid to said conduit, and means for connecting the roller to an electrical circuit.

In testimony whereof I have signed my name to this specification in the presence of two subscribing witnesses.

ERNEST HENRY JONES.

Witnesses:
W. E. ROGERS,
O. J. WORTH.